United States Patent
Ye et al.

(10) Patent No.: US 9,134,850 B2
(45) Date of Patent: Sep. 15, 2015

(54) METHOD AND SYSTEM FOR UPDATING REFERENCE DATA OF CAPACITIVE MULTI-TOUCH SCREEN

(71) Applicant: SHENZHEN HUIDING TECHNOLOGY CO., LTD., Shenzhen, Guangdong (CN)

(72) Inventors: Jinchun Ye, Guangdong (CN); Hua Zhong, Guangdong (CN)

(73) Assignee: SHENZHEN HUIDING TECHNOLOGY CO., LTD., Shenzhen (CN)

( * ) Notice: Subject to any disclaimer, the term of this patent is extended or adjusted under 35 U.S.C. 154(b) by 195 days.

(21) Appl. No.: 13/859,758

(22) Filed: Apr. 10, 2013

(65) Prior Publication Data

US 2013/0234987 A1 Sep. 12, 2013

Related U.S. Application Data

(63) Continuation of application No. PCT/CN2011/076244, filed on Aug. 3, 2011.

(30) Foreign Application Priority Data

May 25, 2011 (CN) .......................... 2011 1 0139017

(51) Int. Cl.
G06F 3/041 (2006.01)
G06F 3/044 (2006.01)

(52) U.S. Cl.
CPC .............. *G06F 3/0418* (2013.01); *G06F 3/044* (2013.01)

(58) Field of Classification Search
CPC ................................ G06F 3/044; G06F 3/0418
USPC ........................................................... 345/174
See application file for complete search history.

(56) References Cited

U.S. PATENT DOCUMENTS

| 8,773,146 B1* | 7/2014 | Hills et al. ..................... 324/658 |
| 2010/0060609 A1* | 3/2010 | Doi et al. ....................... 345/174 |
| 2013/0207935 A1* | 8/2013 | Toda et al. ..................... 345/174 |
| 2014/0146008 A1* | 5/2014 | Miyahara et al. ............. 345/174 |

* cited by examiner

*Primary Examiner* — Allison Johnson

(57) ABSTRACT

A reference data updating method and system for a capacitive multi-touch screen are disclosed. The method includes the steps of step A: one-frame sampling touch detection nodes, calculating a difference between sampled data of each touch detection node and corresponding current reference data and saving the difference as detection data to obtain a current detection data frame; step B: judging whether the current detection data frame is a damaged detection data frame; and step C: executing a touch screen reference update processing procedure under abnormal condition if the current detection data frame is a damaged detection data frame; otherwise, executing a touch screen reference update processing procedure under normal condition. The disclosed method and system can be used in capacitive multi-touch screens fabricated with different materials in different processes and having difference specifications to timely and reliably update the reference data, thereby increasing the reliability of the capacitive multi-touch screens.

18 Claims, 9 Drawing Sheets

METHOD AND SYSTEM FOR UPDATING REFERENCE DATA OF CAPACITIVE MULTI-TOUCH SCREEN

CROSS-REFERENCE TO RELATED APPLICATIONS

This present application is a Continuation Application of PCT application No. PCT/CN2011/076244 filed on Aug. 3, 2011, which claims the benefit of Chinese Patent Application No. 201110139017.1 filed on May 25, 2011; the contents of which are hereby incorporated by reference.

TECHNICAL FIELD

The present invention relates to the field of touch screens and, more particularly, to a method and a system for updating detection reference of a capacitive touch screen.

BACKGROUND

Capacitive multi-touch screens have been more and more widely used in handheld touch devices such as mobile phones and tablet PCs due to their unique advantages in tactile experience, light transmission rate and durability.

The basic detection principle for a capacitive multi-touch screen is briefly discussed below. The capacitive multi-touch includes a capacitive touch sensor and a touch controller connected to the touch sensor. To detect multiple touch points, the touch sensor includes a plurality of touch detection nodes arranged in an array. If the detection nodes are distributed over the touch sensor plane in m rows and n columns, they form an m*n detection node array as shown in FIG. 1A. By sampling the detection node array, the touch controller can obtain a corresponding m*n sampled data array. In practice, the sampled data in an array obtained by one time sampling is termed as one frame of sampled data. In order to detect a touch event, a reference data array is needed, which is established based on steady sampled data that are sampled under no touch event condition and corresponds to each detection data, as shown in FIG. 1B. According to the detection principle of capacitive touch screens, it can be easily understood that the varying portion of the current sampled data with respect to the reference data includes detected touch information.

Referring to FIG. 1C, in order to judge a touch event, the touch detection data of each sampling point is calculated, i.e. $D_{ij}=S_{ij}-R_{ij}$, thereby obtaining a current detection data array or detection data frame, as shown in FIG. 1D. Assuming that a direction of variation of the touch detection data caused by the touch event is positive, the intensity of the touch signal can be measured according to amplitude of the positive variation. In practice, considering that amplitude of the detection data $D_u$ has a certain degree of jitter, a specific method of judging a touch event according to the detection data $D_{ij}$ is as follows. According to a dynamic range of the actual detection data of the touch screen, an appropriate touch event detection threshold Ht is selected such that the detection data with amplitude greater than this threshold is considered as a theoretically reliable touch event. That is, when $D_{ij}>Ht$, it can be determined theoretically that a touch event is detected at this touch detection node. In a group of detection data illustrated in FIG. 1E and FIG. 1F, the detection data Dx3, Dx and Dx4 show such scenarios in which amplitude of the detection data varies because of the touch event and the amplitude variation goes beyond the touch detection threshold Ht. These detection data indicate the occurrence of a touch event. In addition, the detection data Dx3, Dx and Dx4 as well as the detection data distributed therearound can be used to calculate a specific location of the touch point.

FIG. 2 illustrates a general flow chart of touch screen data processing. An initialization stage presets various thresholds and sets initial values of various counters and timers. A touch detection data sampling and reference updating stage obtains a frame of detection data needed for touch detection and updates the reference data at an appropriate time. A touch event analysis stage calculates a location of each valid touch point on the touch screen according to the processing to the touch detection data. A touch detection result output stage outputs information such as, the location and movement trajectory of the detected touch point, to a processor of the touch device.

The above description is only about the basic touch detection principle. With respect to the capacitive multi-touch screen, the touch detection in practice applications is far more complicated. One important issue is that, the reference data of the touch screen need to be reliably and timely updated using new detection data after power on and during later using process; otherwise, reliable touch detection results cannot be continuously obtained from the detection data $D_{ij}$. However, as already known in the art, the touch detection data obtained by the capacitive multi-touch screen in at least the following situations can easily experience abnormity, such that the reference data update may not be reliable.

First, if there is a touch on the touch screen during power on stage, after the first reference data update, the detection data obtained at this touch location probably becomes a data with a direction opposite to a normal detection data and with large amplitude.

Second, the capacitive multi-touch screen detection is based on mutual capacitance or projective capacitance detection principle, and the detection process involves the coupling capacitance between the body of the user and the touch device. If the user performs a multi-touch, under some specific conditions (e.g. when the coupling between the body of the user and the touch device is very weak), it may be caused that negative and large amplitude touch detection data may occur at some specific locations on the touch screen.

Third, water drops or water film on the touch screen surface can also severely affect the touch detection data, which may make the data deviate from normal condition and easily result in the negative and large amplitude touch detection data.

Detection data Dx6, Dx7 and Dx8 in FIG. 1F have a direction opposite to the direction of the usual touch event detection data (e.g. Dx3, Dx and Dx4), and the amplitude of Dx7 is greater than Ht. Such abnormal detection data may easily occur in the above situations. Practical application of the touch screen is far more complicated and unpredictable. Therefore, there is high possibility of the abnormity occurring in one frame of the detection data. Under the condition that such abnormal detection data may occur at any time, there may often be errors in the reference data update processing—once the negative and large amplitude detection data are used in the reference update, the consequence is often that, after the reference data is updated, the touch screen "detects" a false touch event, i.e. a static "touch point." In addition, these false static touch points prevent further update of the reference data, which may make the touch device and system fall into disorder and go out of control.

The following measures have been widely taken to address these issues.

First, better touch screen materials are used, such as, using toughened glass rather than thin film, and fabrication precision of the touch sensor is increased.

Second, the area of a grounding portion of the touch device is increased, such that the coupling capacitance between the user and the touch device is increased and becomes more steady.

However, the first measure increases the fabrication cost—the strict fabrication process makes it difficult to reduce the defect rate and, considering the high material cost, the first measure is not suitable for massive use. The second measure attempts to use a larger grounding area to improve the touch detection performance. This measure can bring good effect to touch devices with relatively large size, such as, tablet PCs. However, to a small device such as a mobile phone, even if a casing of the small device is made from metal, the second measure can bring only limited improvement.

SUMMARY

In one independent embodiment, a reference data updating method for a capacitive multi-touch screen is disclosed. This method may include step A: one-frame sampling touch detection nodes, calculating a difference between sampled data of each touch detection node and corresponding current reference data and saving the difference as detection data to obtain a current detection data frame; step B: analyzing dominant detection data in the current detection data frame obtained in step A to judge whether the current detection data frame is a damaged detection data frame, wherein the damaged detection data frame includes negative dominant detection data, the negative dominant detection data refers to dominant detection data having a direction opposite to a touch signal direction, and the dominant detection data refers to detection data with amplitude greater than a touch event judgment threshold; and step C: executing a touch screen reference update processing procedure under abnormal condition if the current detection data frame is determined to be a damaged detection data frame at step B; otherwise, executing a touch screen reference update processing procedure under normal condition.

In another independent embodiment, a reference data updating system for a capacitive touch screen is disclosed. The system may include a sampled data acquisition unit, a reference data unit, a detection data acquisition unit, a detection data classifying unit, a detection data frame analysis unit, a detection data frame analysis unit, a reference data updating unit, an abnormal condition processing unit, a normal condition processing unit, a touch event determining unit, a threshold providing unit, a counter/timer unit, and a condition restoration period tag unit.

The sampled data acquisition unit may be configured to perform a one-frame sampling to touch screen detection nodes. The reference data unit may be configured to store reference data of the touch screen detection nodes. The detection data acquisition unit may be configured to calculate a difference between the sampled data and corresponding current reference data of the touch screen detection nodes and store the difference as detection data to thereby obtain a current detection data frame, according to the sampled data acquired by sampling operation of the sampled data acquisition unit, the reference data unit, and the reference data stored in the reference data unit. The detection data classifying unit may be configured to classify the data of the current detection data frame acquired by the sampled data acquisition unit in terms of direction and amplitude of the data.

The detection data frame analysis unit may be configured to analyze dominant detection data obtained by the classifying operation of the detection data classifying unit to determine whether the current detection data frame is a damaged detection data frame, wherein the damaged detection data frame includes negative dominant detection data, the negative dominant detection data are dominant detection data having a direction opposite to a touch signal direction, and the amplitude of the dominant detection data is greater than a touch event judgment threshold.

The reference data updating unit may be configured to update the reference data stored in the reference data unit. The abnormal condition processing unit may be configured to control the reference data updating unit to execute a touch screen reference data update processing procedure under abnormal condition when an analysis result of the detection data frame analysis unit is that the current detection data frame is a damaged detection data frame. The normal condition processing unit may be configured to control the reference data updating unit to execute a touch screen reference data update processing procedure under normal condition when an analysis result of the detection data frame analysis unit is that the current detection data frame is a non-damaged detection data frame. The touch event determining unit may be configured to determine whether the current detection data frame contains a touch event under normal condition.

The threshold providing unit may be configured to provide preset threshold parameters. The counter/timer unit may be configured to count number and time. The condition restoration period tag unit may be configured to tag a condition restoration period, wherein the condition restoration period is a preset period of time after a reference data update due to detection of a damaged detection data frame.

Independent aspects of the invention will become apparent by consideration of the detailed description, claims and accompanying drawings.

DESCRIPTION OF THE EMBODIMENTS

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 2:
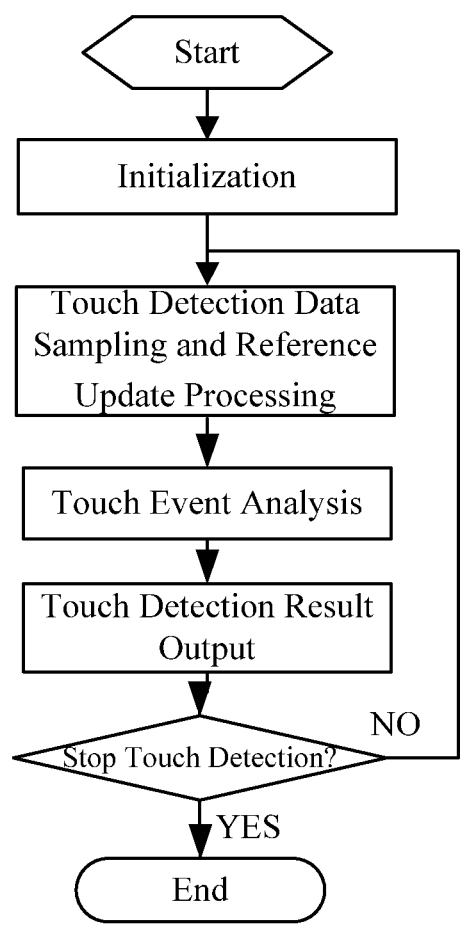
FIG. 2 illustrates a general flow chart of touch screen data processing.
Figure 3:
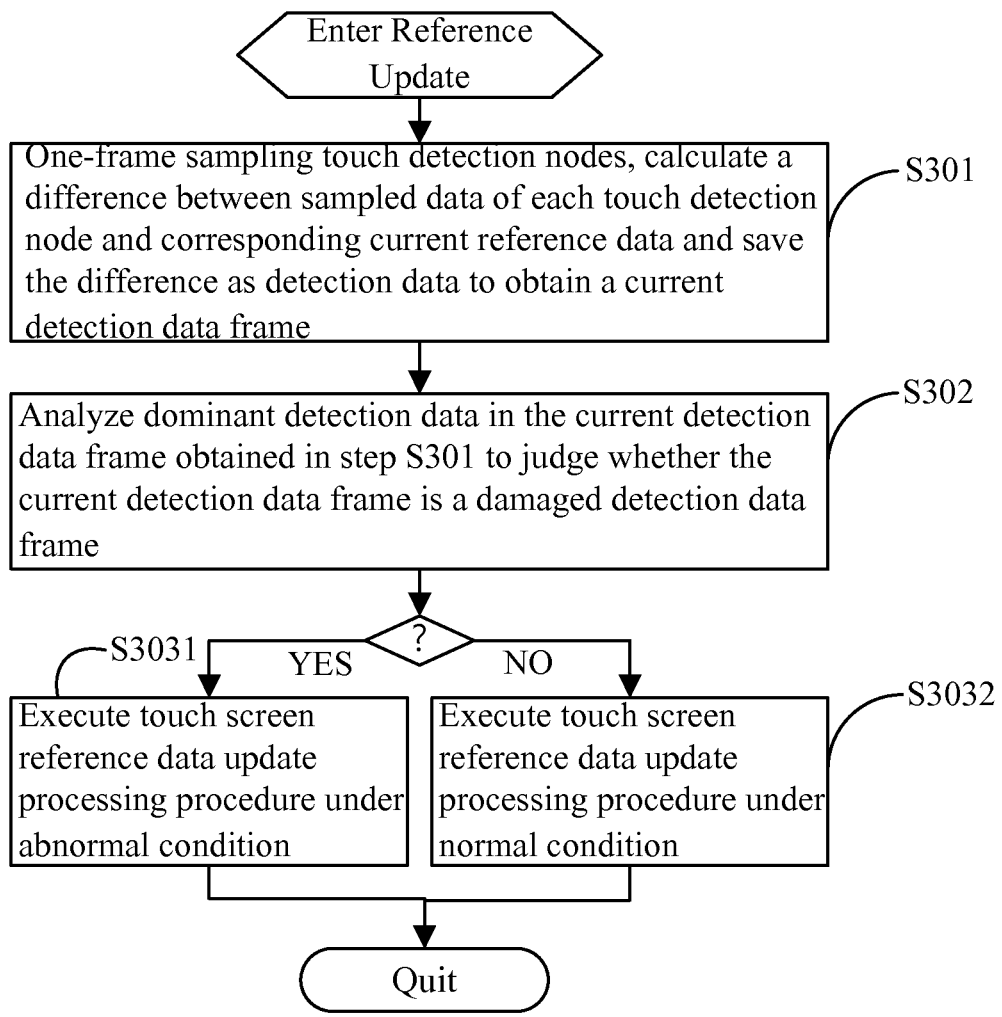
FIG. 3 illustrates a general flow chart of reference data update processing according to one embodiment.

FIG. 2 is a general flow chart of data processing for a touch screen according to one embodiment. At an initialization stage, various thresholds and initial preset values of various counters and timers are preset according to actual conditions and requirements. The data processing then proceeds to a touch detection data sampling and reference updating stage in which a touch controller of the touch screen obtains a frame of detection data for touch detection by sampling touch sensors of the touch screen and updates reference data at an appropriate time. Referring to FIG. 3, in one embodiment, a reference updating method for a capacitive multi-touch screen includes the following steps.

At step S301, various touch detection nodes are one-frame sampled, and a difference between the sampled data of the touch detection node and corresponding current reference data is calculated and saved as detection data to obtain a current detection data frame.

At step S302, dominant detection data in the current detection data frame obtained in step S301 is analyzed to judge whether the current detection data frame is a damaged detection data frame or not. The damaged detection data frame includes negative dominant detection data. The negative dominant detection data refer to dominant detection data having a direction opposite to a touch signal direction, and the dominant detection data refer to detection data with amplitude greater than a touch event threshold. Similarly, positive dominant detection data refer to dominant detection data having the same direction as the touch signal.

In various embodiments, the direction of the detection data refers to a direction in which the detection data vary with respect to the corresponding reference data. It may be necessary to classify a current frame of detection data and identify those data with amplitude of variation great enough to indicate a touch event. Here, the data that need to be identified are the "dominant detection data."

In one embodiment, data in one frame of the touch detection data are classified and identified. The detection data are considered as a variable with both amplitude and direction. Taking FIG. 1F as an example, the illustrated Dx and Dx1-Dx8, as only one group of data in one frame of the detection data, include the following types of data:

1) if classified in terms of the data direction: data Dx and Dx1-Dx5 have a direction consistent with the direction of the detection data variation caused by a touch event and this type of data are called "positive detection data"; on the contrary, data Dx6, Dx7 and Dx8 are "negative detection data."

2) if classified in terms of the data amplitude: Hb in FIG. 1F, referred to as a first threshold, is the benchmark to judge whether the amplitude of the detection data belongs to large amplitude; the data with amplitude beyond Hb is called "large amplitude data" and, therefore, the data Dx2, Dx3, Dx and Dx4 are all positive large amplitude data; data Dx6 and Dx7 are also large amplitude data but are positive ones. These large amplitude data are further screened using a higher second threshold Ht to judge whether the detection data contain a touch event, thus resulting in the "dominant detection data." Obviously, according to these standards, the data Dx3, Dx and Dx4 in FIG. 1 are positive dominant detection data, while the data Dx6 and Dx7 are negative dominant detection data.

It is noted that the above thresholds Ht and Hb are determined according to a valid dynamic range of the values sampled on the touch sensors by the touch controller in a specific application. As the identification standard to identify whether each detection data includes a large amplitude variation or valid touch information, the specific values of the thresholds are often determined based on a combination of experiments and rules of thumb. In general, the positive dominant detection data have a high degree of correlation with the touch event, while the negative dominant detection data indicate an abnormity of the touch detection data.

The damaged detection data frame includes negative dominant detection data which are special data that should not exist under normal condition. From the touch detection principle, it is to be understood that, if the reference updating is performed based on a damaged detection data frame caused by a non-touch event operation (e.g. water covering the touch screen), the consequence is that subsequent touch detection results may contain a false touch event. The most obvious danger of the damaged detection data frame is that, once it is used to update the reference data, it may lead to a false static touch point, because the "static touch point" obtained based on such reference data have all the characteristics of detection data of a true touch point and stays at a fixed position. Therefore, the damaged detection data frame needs to be specially identified and subsequently be specially processed.

As described above, the detection data are analyzed and classified to facilitate recording the type of the detection data used for reference updating in a subsequent process. From the basic touch detection principle, it can be readily understood that, if the reference updating is based on a damaged detection data frame containing negative dominant detection data, then the detection result may easily include a false "static touch point" based on a subsequent touch detection data frame without negative dominant data. Therefore, the subsequent process needs to proceed along different processing paths based on whether the current detection data frame is damaged or not.

At step S3031, if the current detection data frame is determined to be a damaged detection data frame at step S302, then a touch screen reference update processing procedure under abnormal condition is executed.

At step S3032, otherwise, a touch screen reference update processing procedure under normal condition is executed.

Further, if the touch screen reference update processing procedure under abnormal condition was previously executed and the reference data was updated, then the touch screen reference update processing procedure under normal condition may need to include a static touch point elimination process. However, if there was no touch screen reference update processing procedure under abnormal condition previously executed, then the touch screen reference update processing procedure under normal condition needs not to include the static touch point elimination process.

As described above, the subsequent process is determined based on whether the current detection data frame is damaged or not. Specifically, the method for judging whether the current detection data frame is damaged or not is as follows.

If the dominant detection data in the current detection data frame are all negative, then it is determined that the current detection data frame is a damaged detection data frame.

If the current detection data frame contains both the positive dominant detection data and negative dominant detection data, and none of the positive dominant detection data is continuously supported by adjacent positive dominant detection data distributed therearound, then it is determined that the current detection data frame is a damage detection data frame.

That the positive dominant detection data is "continuously supported by adjacent positive dominant detection data distributed therearound" is a qualitative concept, which means that the positive dominant detection data does not exist alone, but rather existing together with a sufficient number of adjacent detection data distributed around and having the same direction as this positive dominant detection data. In one embodiment, the detection scope of one touch detection node is about 5 mm*5 mm. Below, this embodiment provides an exemplary quantitative method and basis for determining whether a dominant detection data is continuously supported by adjacent detection data distributed therearound according to an average size of human finger.

Figure 1A:
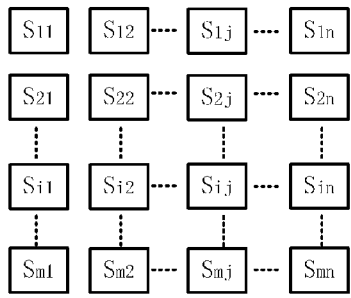
FIG. 1A illustrates a sampled data array of a capacitive multi-touch screen having m*n detection nodes.
Figure 1B:
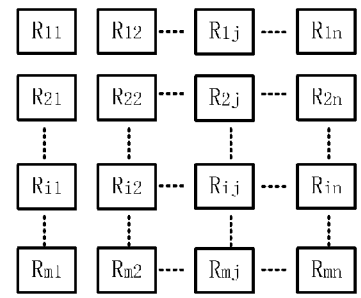
FIG. 1B illustrates a reference data array of a capacitive multi-touch screen having m*n detection nodes.
Figure 1C:
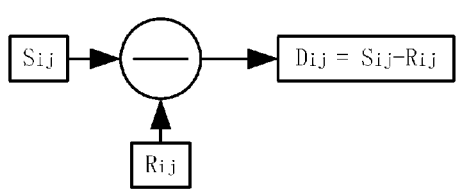
FIG. 1C illustrates the calculation of detection data from the sampled data and the reference data.
Figure 1D:
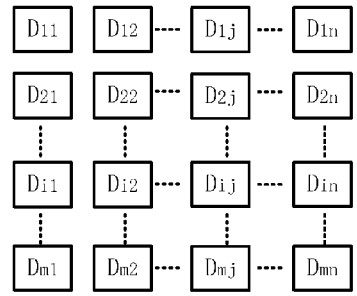
FIG. 1D illustrates a detection data array of a capacitive multi-touch screen having m*n detection nodes.
Figure 1E:
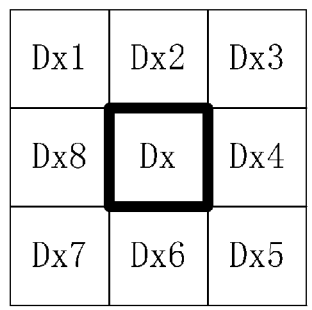
FIG. 1E illustrates a positional relationship between one detection data Dx and adjacent detection data Dx1-Dx8.
Figure 1F:
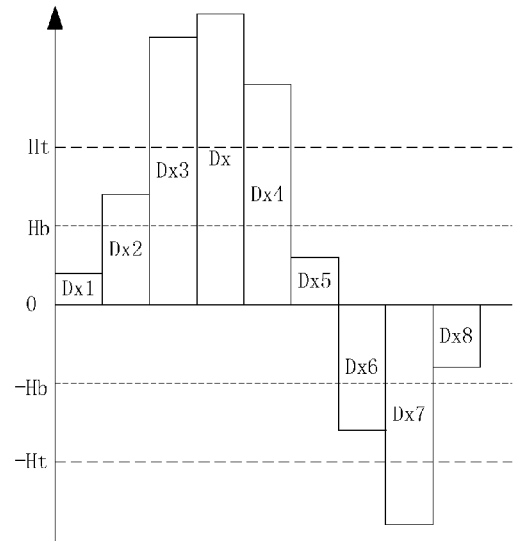
FIG. 1F illustrates a group of detection data including different types of data.

Referring to FIG. 1E, the data Dx is a dominant detection data with eight adjacent detection data Dx1-Dx8 distributed therearound. If the number of the adjacent detection data that have the same direction as the data Dx is no less than four and the number of the domination detection data is no less than two, then it is determined that this dominant detection data is continuously supported by adjacent detection data distributed therearound; otherwise, it is determined that the dominant detection data is not continuously supported by adjacent detection data distributed therearound. In other words, to determine that the dominant detection data Dx is continuously supported by adjacent detection data distributed therearound, there must be at least four data having the same direction as the data Dx and at least two of them are dominant data. If the detection data of FIG. 1F one-to-one correspond to the data of FIG. 1E, then obviously the data Dx, Dx3 and Dx4 are each continuously supported by adjacent detection data distributed therearound.

Figure 4A:
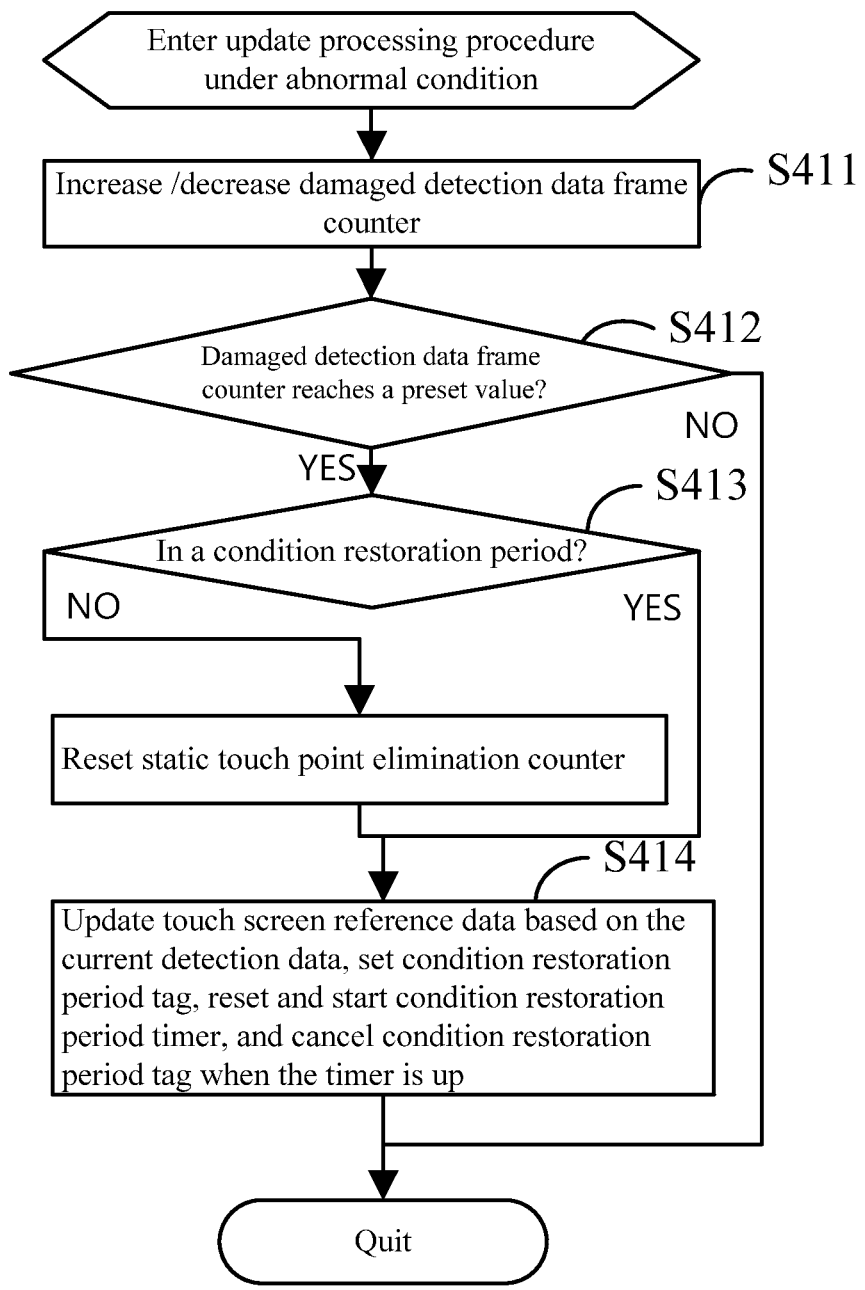
FIG. 4A illustrates a flow chart of reference data update processing under abnormal condition according to one embodiment.

Referring to FIG. 4A, specifically, the touch screen reference update processing procedure under abnormal condition includes the following steps.

At step S411, a damaged detection data frame counter is increased/decreased.

At step S412, if a count value of the damaged detection data frame counter does not reach a preset value, then the touch screen reference update processing procedure under abnormal condition quits without any processing.

At step S413, if the count value of the damaged detection data frame counter reaches a preset value and the counter is not in a condition restoration period, then a static touch point elimination counter is reset.

At step S414, the touch screen reference data are updated based on the current detection data; a condition restoration period tag is set, a condition restoration period timer is reset and started, and the condition restoration period tag is cancelled when the timer is up.

The purpose of increasing/decreasing the damaged detection data frame counter and the judging operations conducted in above steps S411 to S413 is to make sure that a preset number of damaged detection data frames must be detected before the reference data are updated to increase reliability of the updating operations. In one embodiment, a suitable preset number is preset according to an actual scan period, such that it takes about 256 ms to reach the preset number. At step S414, the set condition restoration period tag indicates that there is a damaged detection data frame that triggers a reference updating operation and at the same time triggers a counting process of the condition restoration period timer that is preset with a specified time. Once the condition restoration period timer is up, the set condition restoration period tag is immediately cancelled, indicating that this condition restoration period is over. In one embodiment, the preset specified time of the condition restoration period timer is such that the whole counting process can complete within 30 s. That is, once a reference updating operation is performed under abnormal condition, it takes a transitional period of at least 30 s to restore to normal condition. In this condition restoration period, step S413 does not reset the static touch point elimination counter for the purpose of limiting the number of operations of eliminating the static touch point during the condition restoration period. In one embodiment, the number of the operations of eliminating the static touch point is limited to be no more than three.

Figure 4B:
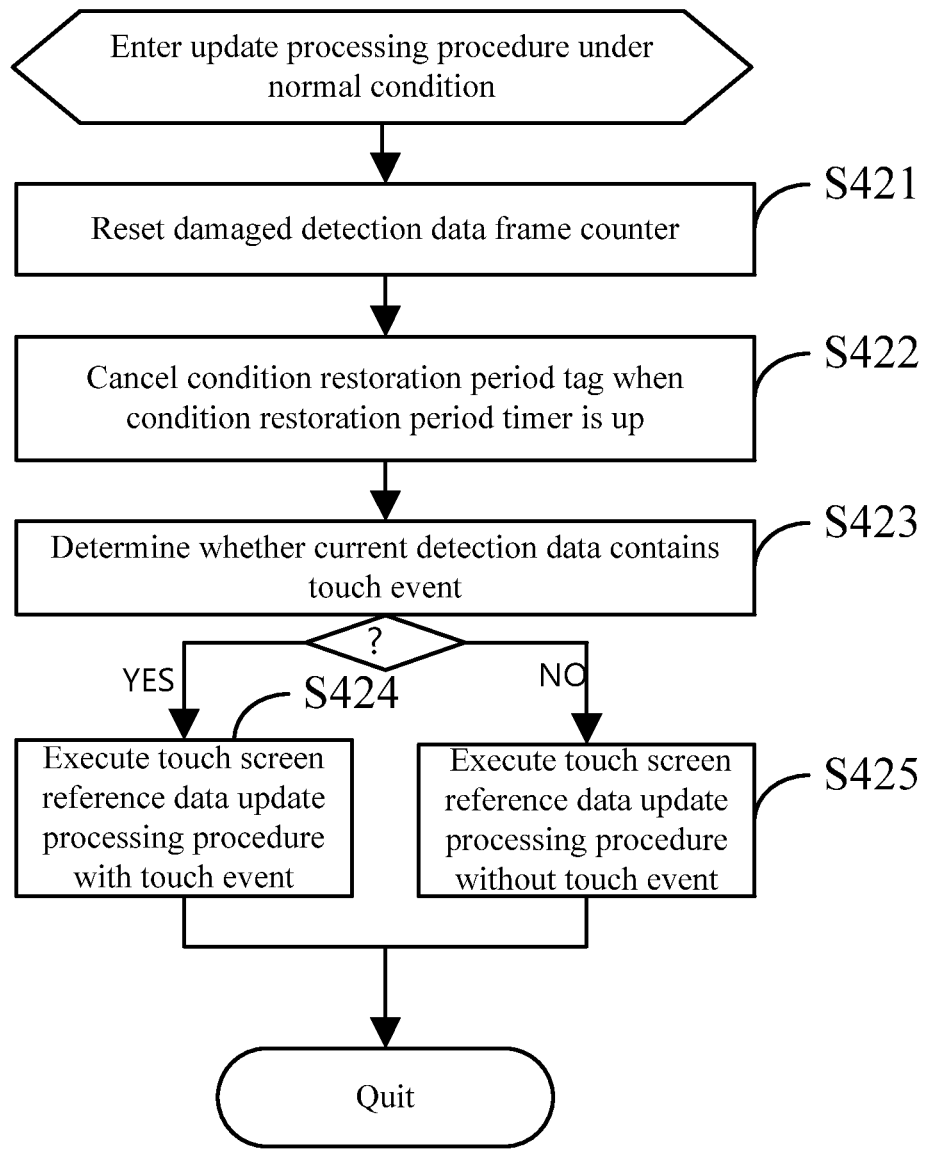
FIG. 4B illustrates a flow chart of reference data update processing under normal condition according to one embodiment.

Referring to FIG. 4B, the touch screen reference update processing procedure under normal condition of step S3032 includes the following steps.

At step S421, the damaged detection data frame counter is reset.

At step S422, when the condition restoration period timer is up, the condition restoration period tag is cancelled and the static touch point elimination counter is reset.

At step S423, it is determined whether the current detection data frame contains a touch event.

At step S424, if there is a touch event, then a touch screen reference data update processing procedure with touch event is executed.

At step S425, if there is not a touch event, then a touch screen reference data update processing procedure without touch event is executed.

Resetting the damaged detection data frame counter at step S421 enables the damaged detection data frame counter to continuously detect a preset number of damaged detection data frames such that the touch screen reference update processing procedure under abnormal condition can be executed. The operation to the condition restoration period tag at step S422 is to make sure the set condition restoration period tag is immediately cancelled once the condition restoration period timer is up, indicating that this condition restoration period is over. The operations to the condition restoration period tag and to the condition restoration period timer are performed only in the touch screen reference update processing procedure under abnormal condition. In one embodiment, a timing length of the condition restoration period timer achieved by the preset specified time is about 30 s. At steps S423, S424 and S425, the touch screen reference update processing procedure under normal condition proceeds further along two paths (one with touch event and the other without touch event) according to whether the current detection data frame contains a touch event. This facilitates obtaining the correct reference data update result and eliminating the false static touch point during the condition restoration period.

Specifically, the method and basis for determining that the current detection data frame contains a touch event are as follows: the dominant detection data are all positive dominant detection data; or the number of the positive dominant detection data is greater than the number of the negative dominant detection data; or any one of the positive dominant detection data is continuously supported by the detection data distributed therearound.

Figure 4C:
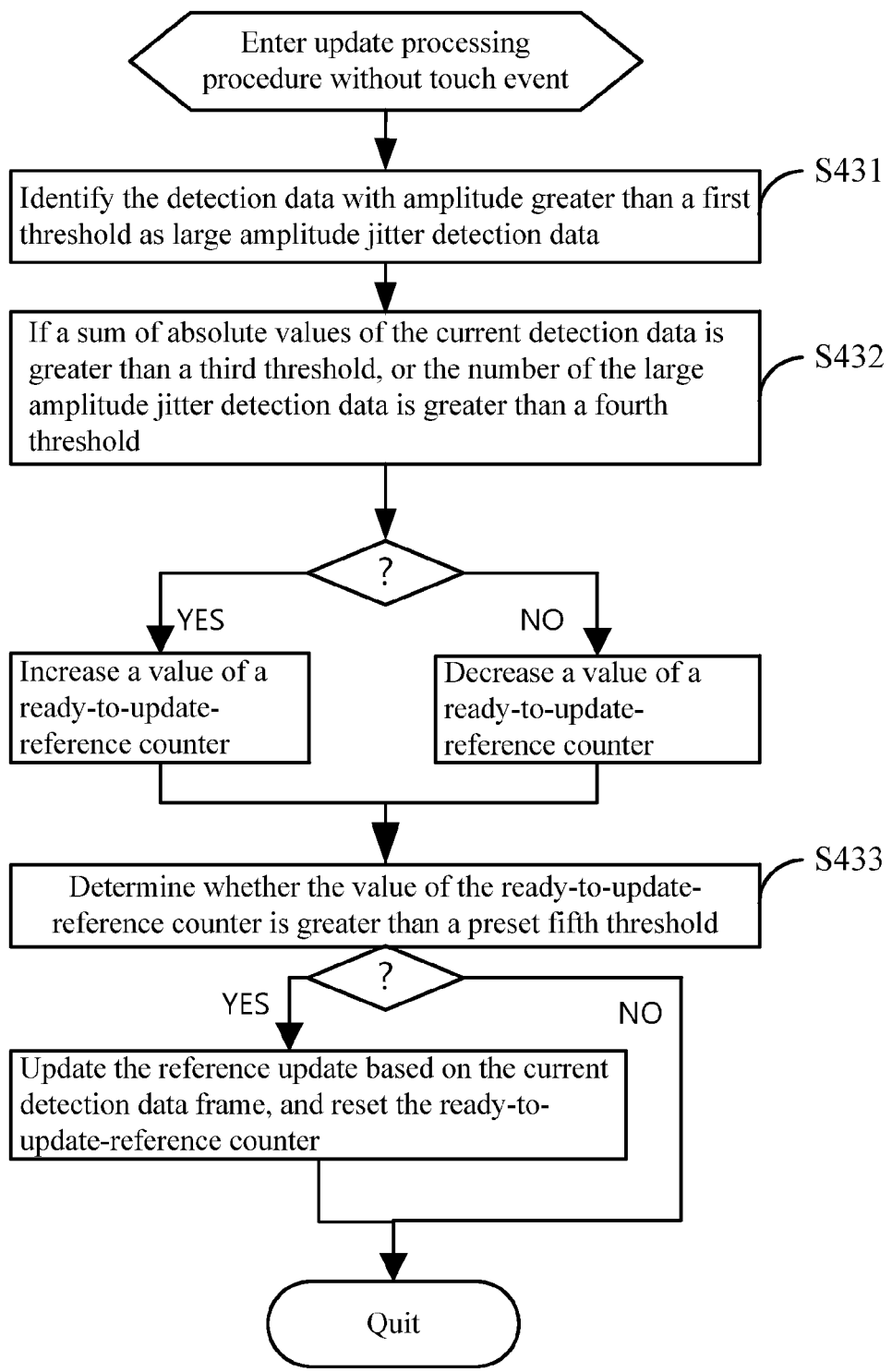
FIG. 4C illustrates a flow chart of reference data update processing without touch event according to one embodiment.

In one embodiment illustrated in FIG. 4C, specifically, the touch screen reference data update processing procedure without touch event of step S425 includes the following steps.

At step S431, the detection data with amplitude greater than a first threshold is identified as large amplitude jitter detection data, wherein the first threshold is a large amplitude judgment threshold of the detection data.

At step S432, if a sum of absolute values of the current detection data is greater than a third threshold, or the number of the large amplitude jitter detection data is greater than a fourth threshold, then a value of a ready-to-update-reference counter is increased, otherwise the value of the ready-to-update-reference is decreased, wherein the third threshold is a drift amplitude judgment threshold of the touch screen detection data frame, and the fourth threshold is a jitter judgment threshold of the touch screen detection data frame.

At step s433, if the value of the ready-to-update-reference counter is greater than a preset fifth threshold, the reference update is performed based on the current detection data, and the ready-to-update-reference counter is reset, wherein the fifth threshold is a preset threshold of the ready-to-update-reference counter.

The thinking behind the above steps is that, if the current detection data frame exhibits an obvious overall offset, or local data have obvious jitter but not sufficient to establish a touch event, and an obvious trend of this situation continues, then it is considered that the condition for reference update is met. Here, the first threshold is used to screen large amplitude jitter data, the third threshold is used to judge the overall offset level of the current detection data frame, the fourth threshold is used to judge the jitter level of the current detection data frame, the fifth threshold is the preset threshold of the ready-to-update-reference counter which is used to make sure that the reference data updating operation is performed only when an obvious steady trend is present, thus ensuring the correctness of reference data update. In one embodiment, values of the first threshold 10, third threshold 350, fourth threshold 5 and fifth threshold are selected such that the time to reach the preset value of ready-to-update-reference counter is about 256 ms.

Specifically, to increase the sensitivity to the jitter of the detection data during the condition restoration period, at step S432, the value of the fourth threshold during the condition restoration period is less than the value of the fourth threshold during a non condition restoration period. In one embodiment, the value of the fourth threshold during the condition restoration period is 0 or 1.

Figure 4D:
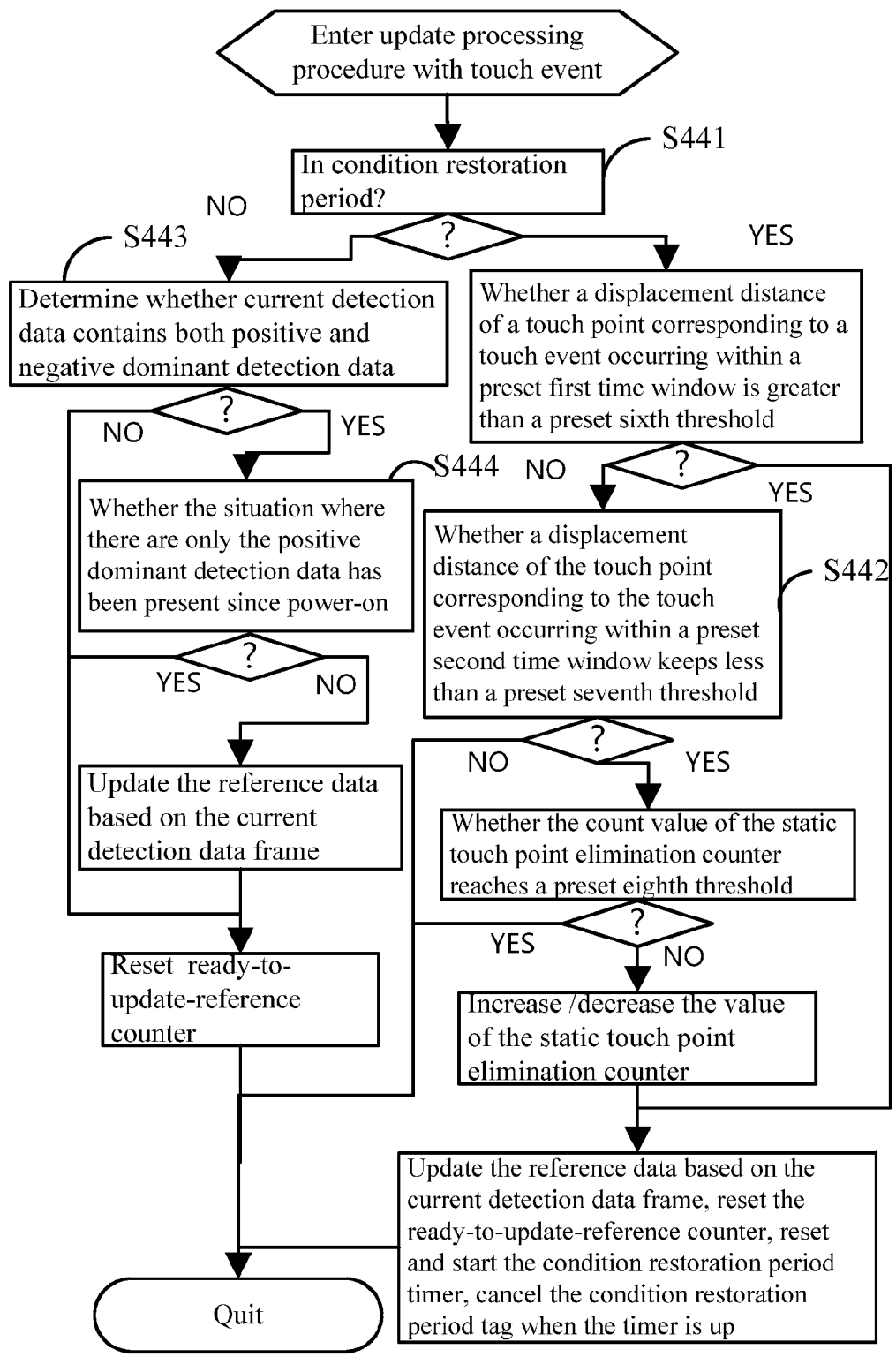
FIG. 4D illustrates a flow chart of reference data update processing with touch event according to one embodiment.

In one embodiment illustrated in FIG. 4D, specifically, the touch screen reference data update processing procedure with touch event of step S425 includes the following steps.

At step S441, if in the condition restoration period, a displacement distance of a touch point corresponding to a touch event appearing within a preset first time window is greater than a preset sixth threshold, then the reference data update is performed based on the current detection data frame, the ready-to-update-reference counter is reset, the condition restoration period timer is reset and started, and the condition restoration period tag is cancelled when the timer is up. The sixth threshold is the touch point jump distance judgment threshold during the condition restoration period.

At step S442, if in the condition restoration period, a displacement distance of a touch point corresponding to a touch event appearing within a preset second time window keeps less than a preset seventh threshold, and if the count value of the static touch point elimination counter is less than a preset eighth threshold, then the value of the static touch point elimination counter is increased/decreased, the reference data update is performed based on the current detection data frame, the ready-to-update-reference counter is reset, the condition restoration period timer is reset and started, and the condition restoration period tag is cancelled when the timer is up. The seventh threshold is the touch point static distance judgment threshold during the condition restoration period, and the eighth threshold is the threshold of the number of the static touch point elimination times.

At step S443, if not in the condition restoration period, the current detection data frame contains both positive and negative dominant detection data, and the situation where there are only the positive dominant detection data has never been present since power-on, then the reference data update is performed based on the current detection data frame, and the ready-to-update-reference counter is reset.

At step S444, if not in the condition restoration period, and the situation where there are only the positive dominant detection data has been present since power-on, then the ready-to-update-reference counter is reset.

The thinking behind the above steps is that, if long distance quick jump or long time stay of a touch point (these two events may easily occur when the user wipes the screen to remove the water thereon or touch-operates the screen with water thereon) is detected during the condition restoration period, the reference data updating operation needs to be immediately performed. This is actually a process to eliminate the jump touch point and static touch point. In particular, elimination of the static touch point can be very important, because if the static touch point is not eliminated in time, the touch detection system would fail. If not in the condition restoration period, the reference data update is considered only when the current detection data frame contains both positive and negative dominant detection data, and the situation where there are only the positive dominant detection data has never been present since power-on. This way, the touch screen reference data update processing procedure not only satisfies the requirements that the reference data update needs to be performed several times when power on under some special circumstances, but only avoid affecting normal touch detection operations.

In the present embodiment, detection of the long distance quick jump and long time stay of the touch point needs to use parameters such as the preset sixth and seventh thresholds, and the first and second time windows. If the jump distance of the touch point within the first time window is greater than the distance set by the sixth threshold, it is determined that the long distance jump of the touch point occurs. If the displacement of the touch point within the second time window is no more than the distance set by the seventh threshold, it is determined that the long time stay of the touch point occurs. In one exemplary embodiment, the first time window is set as about 16 ms, and the distance corresponding to the sixth threshold is set as about 10 cm; the second time window is set as about 3 s, and the distance corresponding to the seventh threshold is set as about 0.3 mm.

In addition, the step S442 in the above embodiment further employs a static touch point elimination counter with the eighth threshold to limit the times of mandatorily eliminating static touch point. This static touch point elimination counter is to limit the times of the operation of eliminating the static touch point and is only functional during the condition restoration period. Therefore, this static touch point elimination counter is reset if not in the condition restoration period. In one exemplary embodiment, the eighth threshold is set as three. That is, the times of eliminating the static touch point are limited to be no more than three. In addition, the steps S441 to S444 also involve resetting the ready-to-update-reference counter, which is to appropriately delay the time of reference data update operation when the detection result is there is no touch event, thereby preventing a too short time interval between two reference update operations. With respect to resetting and starting the condition restoration period timer, it is to maintain a sufficiently long condition restore period for transition to steady normal condition, such that a user can deal with the abnormal condition of the touch screen during this condition restoration period, for example, wiping the touch screen to remove the water thereon.

People skilled in the art can appreciate that part or all of the steps of the method of the above embodiments can be implemented by hardware under the instruction of program. The program may be stored on a computer readable medium such as ROM/RAM, magnetic disk, optical disc or the like.

Figure 5:
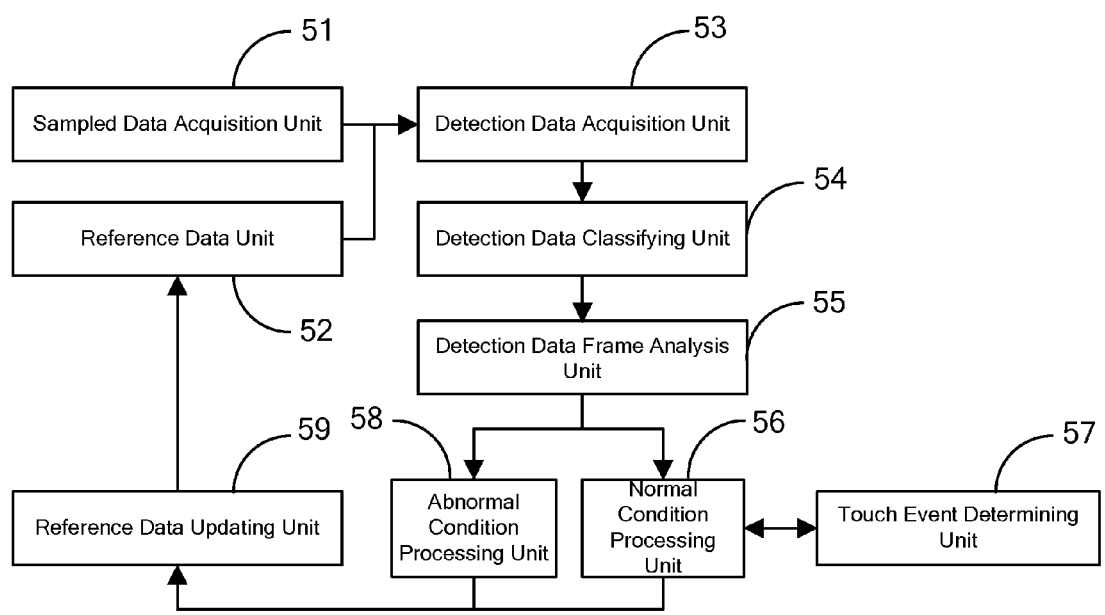
FIG. 5 illustrates a reference data update system according to one embodiment.

FIG. 5 illustrates a detection reference data update system for a capacitive touch screen according to one embodiment. This update system may be implemented by a software unit embedded in a touch terminal.

In the present embodiment, the detection reference data update system includes a sampled data acquisition unit 51, a reference data unit 52, a detection data acquisition unit 53, a detection data classifying unit 54, a detection data frame analysis unit 55, a normal condition processing unit, a touch event determining unit 57, an abnormal condition processing unit 58, and a reference data updating unit. The detection reference data update system further includes a threshold providing unit (not shown), a counter/timer unit (not shown), and a condition restoration period tag unit (not shown).

The function of each unit is described below.

The sampled data acquisition unit 51 is used to perform a one-frame sample to the touch screen detection nodes.

The reference data unit 52 is used to store the reference data of the touch screen detection nodes.

The detection data acquisition unit 53 is used to calculate a difference between the sampled data and corresponding current reference data of the touch screen detection nodes and store the difference as detection data to thereby obtain a current detection data frame, according to the sampled data acquired by sampling operation of the sampled data acquisition unit, the reference data unit, and the reference data stored in the reference data unit.

The detection data classifying unit 54 is used to classify the data of the current detection data frame acquired by the sampled data acquisition unit in terms of direction and amplitude of the data.

The detection data frame analysis unit 55 is used to analyze dominant detection data obtained by the classifying operation of the detection data classifying unit 54 to determine whether the current detection data frame is a damaged detection data frame; the damaged detection data frame includes negative dominant detection data, the negative dominant detection data are dominant detection data having a direction opposite to a touch signal direction, and the amplitude of the dominant detection data is greater than a touch event judgment threshold.

The reference data updating unit 29 is used to update the reference data stored in the reference data unit.

The abnormal condition processing unit 58 is used to control the reference data updating unit to execute the touch screen reference data update processing procedure under abnormal condition when the analysis result of the detection data frame analysis unit is that the current detection data frame is a damaged detection data frame.

The normal condition processing unit 56 is used to control the reference data updating unit to execute the touch screen reference data update processing procedure under normal condition when the analysis result of the detection data frame analysis unit is that the current detection data frame is a non-damaged detection data frame.

The touch event determining unit 57 is used to determine whether the current detection data frame contains a touch event under normal condition.

The threshold providing unit is used to provide preset threshold parameters. In one embodiment, the threshold providing unit provides at least eight thresholds as defined above.

The counter/timer unit is used to count number and time.

The condition restoration period tag unit is used to tag the condition restoration period. The condition restoration period is a preset period of time after a reference update due to detection of a damaged detection data frame.

Figure 6A:
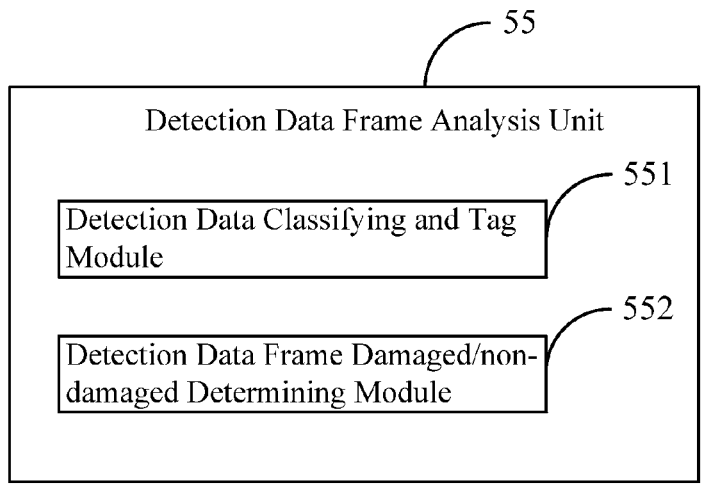
FIG. 6A illustrates a detection data frame analysis unit according to one embodiment.

Referring to FIG. 6A, the detection data frame analysis unit 55 includes a detection data tag module 551 and a detection data frame damaged/non-damaged determining module 552. The detection data tag module 551 tags the dominant detection data in the data obtained by the detection data classifying unit. The detection data frame damaged/non-damaged determining module 552 determines whether the current detection data frame is a damaged detection data frame or not by judging the dominant detection data tagged by the detection data tag module in a manner described below.

If the dominant detection data tagged by the detection data tag module 551 are all negative, then it is determined that the current detection data frame is a damaged detection data frame.

If the dominant detection data tagged by the detection data tag module 551 contain both positive and negative dominant detection data, and none of the positive dominant detection data is continuously supported by a sufficient number of the positive dominant detection data distributed therearound, then it is determined that the current detection data frame is a damaged detection data frame, and the positive dominant detection data are the dominant detection data having a direction of variation with respect to the reference data that is the same as the direction of variation of the touch signal.

Figure 6B:
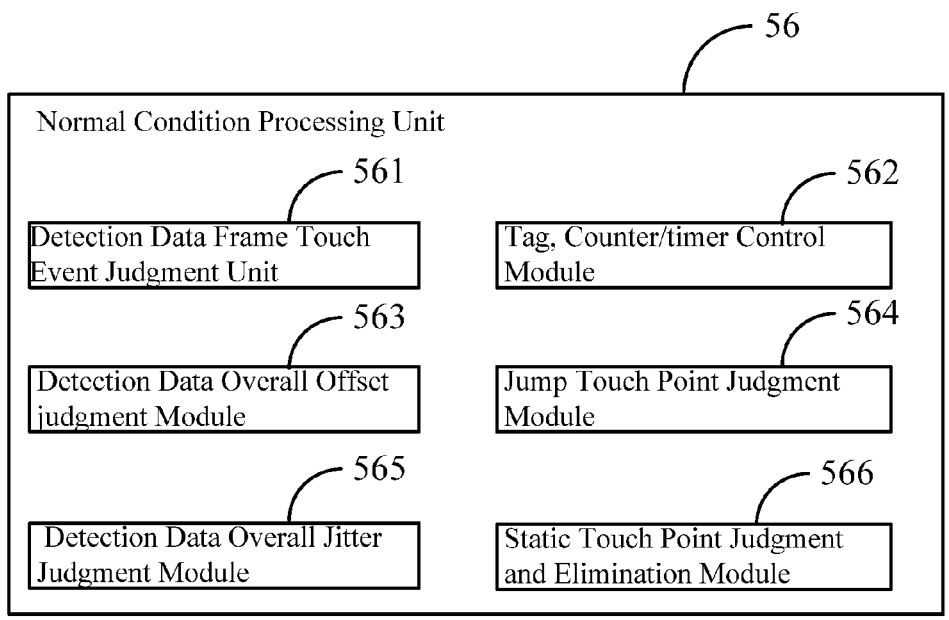
FIG. 6B illustrates a normal condition processing unit according to one embodiment.
Figure 6C:
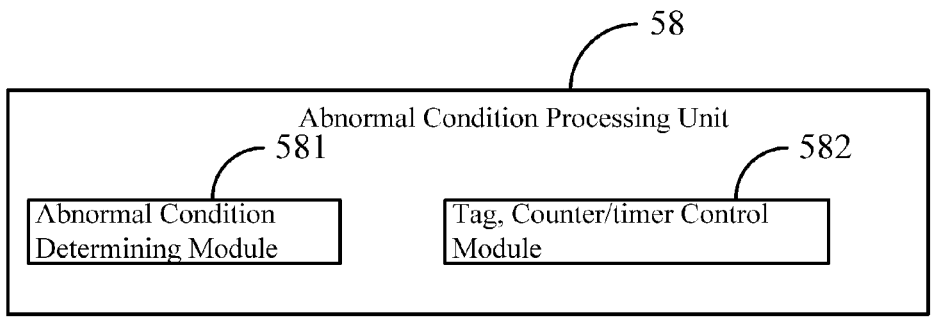
FIG. 6C illustrates an abnormal condition processing unit according to one embodiment.

Referring to FIG. 6C, the abnormal condition processing unit 58 includes an abnormal condition determining module 581 and a tag, counter/timer control module 582. The abnormal condition determining module 581 determines that it is currently under abnormal condition when the analysis result of the detection data frame analysis unit 55 is that the current detection data frame is a damaged detection data frame. After the abnormal condition is determined, the tag, counter/timer control module 582 controls the reference data update unit to execute the touch screen reference data update processing procedure under abnormal condition in a manner described below:

A damaged detection data frame counter in the counter/timer unit is increased/decreased.

If a count value of the damaged detection data frame counter does not reach a preset value, then the touch screen reference update processing procedure under abnormal condition quits without any processing.

If the count value of the damaged detection data frame counter reaches a preset value and the counter is not in a condition restoration period, then a static touch point elimination counter in the counter/timer unit is reset; the condition restoration period is a preset period of time after a reference update due to detection of a damaged detection data frame.

The touch screen reference data are updated based on the current detection data; a condition restoration period tag is set, a condition restoration period timer in the counter/timer unit is reset and started, and the condition restoration period tag is cancelled when the timer is up.

Referring to FIG. 6B, the normal condition processing unit 56 at least includes a detection data frame touch event judgment unit 561 and a tag, counter/timer control module 562. The tag, counter/timer control module 562 is used to reset the damaged detection data frame counter in the counter/timer unit; the tag, counter/timer control module 562 is further used to cancel the condition restoration period tag and reset the static touch point elimination counter in the counter/timer unit when the condition restoration period timer in the counter/timer unit is up; the condition restoration period is a preset period of time after a reference update due to detection of a damaged detection data frame.

The detection data frame touch event judgment unit 561 is used to judge whether the current detection data frame contains a touch event, and, when determining that there is a touch event, controls the reference data update unit 59 to execute the touch screen reference data update processing procedure with touch event. Otherwise, the reference data update unit 59 is controlled to execute the touch screen reference data update processing procedure without touch event.

The method and basis for the detection data frame touch event judgment unit 561 to determine that the current detection data frame contains a touch event are as follows:

if the analysis result of the detection data frame analysis unit 55 is that the dominant detection data are all positive dominant detection data; or if the analysis result of the detection data frame analysis unit 55 is that the number of the positive dominant detection data is greater than the number of the negative dominant detection data; or if the analysis result of the detection data frame analysis unit 55 is that there is one of the positive dominant detection data that is continuously supported by a sufficient number of dominant detection data distributed therearound.

The detection data frame analysis unit 55 determines whether there is one of the positive dominant detection data that is continuously supported by a sufficient number of dominant detection data distributed therearound in a manner described below.

If the number of the detection data having the same direction of this positive detection data in the detection data adjacent this positive detection data is no less than four and the number of the adjacent dominant detection data is no less than two, then it is determined that this positive dominant detection data is continuously supported by the detection data distributed therearound; otherwise, it is determined that this positive dominant detection data is not continuously supported by the detection data distributed therearound.

Referring to FIG. 6B, the normal condition processing unit 56 further includes a detection data overall offset judgment module 563 and a detection data overall jitter judgment module 565. The detection data overall jitter judgment module 565 identifies the detection data with jitter amplitude larger than a first threshold as large amplitude jitter detection data, wherein the first threshold is provided by the threshold providing unit and is the large amplitude judgment threshold of the detection data; the detection data overall offset judgment module 563 is used to judge whether a sum of absolute values of the current frame of detection data is greater than a preset third threshold, wherein the third threshold is provided by the threshold providing unit and is an offset amplitude judgment threshold of the touch screen detection data.

When the judgment result of the detection data overall offset judgment module 563 is that the sum of the absolute values of the current frame of detection data is greater than the preset third threshold, or the number of the large amplitude detection data determined by the detection data overall jitter judgment module 565 is greater than the fourth threshold, the tag, counter/timer control module 562 increases the read-to-update-reference counter in the counter/timer unit, otherwise the read-to-update-reference counter is decreased, wherein the fourth threshold is provided by the threshold providing unit as a jitter judgment threshold of the touch screen detection data.

When the count value of the read-to-update-reference counter is greater than a fifth threshold, then the reference data update unit 59 is controlled to update the reference data based on the current frame of detection data, and the tag, counter/timer control module 562 resets the read-to-update-reference counter, wherein the fifth threshold is provided by the threshold providing unit as a preset threshold of the read-to-update-reference counter.

The value of the fourth threshold during the condition restoration period is smaller than its value during the non condition restoration period.

Referring to FIG. 6B, the normal condition processing unit 56 further includes a jump touch point judgment module 564 and a static touch point judgment and elimination module 566. The jump touch point judgment module 564 is used to judge whether the displacement distance of the touch point corresponding to a touch event is greater than a preset sixth threshold within a preset first time window during the condition restoration period. If it is greater than the sixth threshold, then the reference data update unit 59 is controlled to update the reference data based on the current frame of detection data and the tag, counter/timer control module 562 resets the read-to-update-reference counter, wherein the sixth threshold is provided by the threshold providing unit as a jump distance threshold of the touch point during the condition restoration period.

If the judgment result of the jump touch point judgment module 564 within a present second time window during the condition restoration period is that the displacement distance of the touch point corresponding to the touch event keeps less than a preset seventh threshold, or the count value of the static touch point elimination counter in the counter/timer unit is less than an eighth threshold, then the reference data update unit 59 updates the reference data based on the current frame of detection data, and the tag, counter/timer control module 562 resets the read-to-update-reference counter in the counter/timer unit and increases/decreases the static touch point elimination counter, wherein the seventh threshold is provided by the threshold providing unit as a displacement threshold of the static touch point during the condition restoration period, and the eighth threshold is provided by the threshold providing unit as a count threshold of the static touch point elimination times.

If not in the condition restoration period, the analysis result of the detection data analysis unit 55 is that the current detection data frame contains both positive and negative dominant detection data, and the situation where the dominant detection data are all positive has never been present since power on, then the reference data update unit 59 is controlled to update the reference data based on the current frame of detection data, and the tag, counter/timer control module 562 resets the read-to-update-reference counter.

If not in the condition restoration period, the situation where the dominant detection data are all positive has been present since power on, then the tag, counter/timer control module 562 resets the read-to-update-reference counter.

In the above exemplary embodiments, the detection data undergo a damage/non-damage analysis and a special process is conducted to the reference data update under abnormal condition. In particular, a condition restoration period is defined, and a special process is also conducted to the reference data update in the case of a touch event during the condition restoration period. These measures can prevent the capacitive multi-touch screen from going out of control due to inappropriate reference update under various using conditions, thus improving the reliability of the touch control device. By suitably setting parameters such as the various thresholds, counter, timer and time windows, the disclosed method and system can be adapted to capacitive multi-touch screens and touch devices fabricated with different materials in different processes while achieving the same improvement results.

One or more independent features and advantages of the invention may be set forth in the following claims.

What is claimed is:

1. A reference data updating method for a capacitive multi-touch screen, comprising:
   step A: one-frame sampling touch detection nodes, calculating a difference between sampled data of each touch detection node and corresponding current reference data and saving the difference as detection data to obtain a current detection data frame;
   step B: analyzing dominant detection data in the current detection data frame obtained in step A to judge whether the current detection data frame is a damaged detection data frame, wherein the damaged detection data frame includes negative dominant detection data, the negative dominant detection data refer to dominant detection data having a direction opposite to a touch signal direction, and the dominant detection data refer to detection data with amplitude greater than a touch event judgment threshold; and
   step C: executing a touch screen reference update processing procedure under abnormal condition if the current detection data frame is determined to be a damaged detection data frame at step B; otherwise, executing a touch screen reference update processing procedure under normal condition,
   wherein the touch screen reference data update processing procedure under abnormal condition includes the steps of:
   increasing/decreasing a value of a damaged detection data frame counter;
   quitting without any processing if a count value of the damaged detection data frame counter does not reach a preset value;
   resetting a static touch point elimination counter if the count value of the damaged detection data frame counter reaches a preset value and the counter is not in a condition restoration period, wherein the condition restoration period is a preset period of time after a reference update due to detection of a damaged detection data frame; and
   updating the touch screen reference data based on the current detection data, setting a condition restoration period tag, resetting and starting a condition restoration period timer, and cancelling the condition restoration period tag when the timer is up.

2. The updating method according to claim 1, wherein the step B judges whether the current detection data frame is a damaged detection data frame in a manner that:
   if the dominant detection data of step B are all negative, then it is determined that the current detection data frame is a damaged detection data frame; or
   if the dominant detection data of step B contain both positive and negative dominant detection data, and none of the positive dominant detection data is continuously supported by a sufficient number of the positive dominant detection data distributed therearound, then it is determined that the current detection data frame is a damaged detection data frame, wherein the positive dominant detection data are dominant detection data having the same direction as the touch signal direction.

3. The updating method according to claim 2, wherein whether there is one of the positive dominant detection data that is continuously supported by a sufficient number of dominant detection data distributed therearound is determined in a manner that:
   if the number of the detection data having the same direction of this positive detection data in the detection data adjacent this positive detection data is no less than four and the number of the adjacent dominant detection data is no less than two, then it is determined that this positive dominant detection data is continuously supported by the detection data distributed therearound; otherwise, it is determined that this positive dominant detection data is not continuously supported by the detection data distributed therearound.

4. The updating method according to claim 1, wherein the touch screen reference update processing procedure under normal condition includes the steps of:
   resetting a damaged detection data frame counter;
   when a condition restoration period timer is up, cancelling a condition restoration period tag and resetting a static touch point elimination counter, wherein the condition restoration period is a preset period of time after a reference update due to detection of a damaged detection data frame;
   determining whether the current detection data frame contains a touch event;
   if there is a touch event, executing a touch screen reference data update processing procedure with touch event; and
   if there is not a touch event, executing a touch screen reference data update processing procedure without touch event.

5. The updating method according to claim 4, wherein it is determined that the current detection data frame contains a touch event if:
   the dominant detection data are all positive dominant detection data, wherein the positive dominant detection data are dominant detection data having the same direction as the touch signal direction; or
   the number of the positive dominant detection data is greater than the number of the negative dominant detection data; or
   any one of the positive dominant detection data is continuously supported by the position dominant detection data distributed therearound.

6. The updating method according to claim 4, wherein the touch screen reference data update processing procedure without touch event includes the steps of:
   identifying the detection data with amplitude greater than a first threshold as large amplitude jitter detection data, wherein the first threshold is a large amplitude judgment threshold of the detection data;
   if a sum of absolute values of the current detection data is greater than a third threshold, or the number of the large amplitude jitter detection data is greater than a fourth threshold, then increasing a value of a ready-to-update-reference counter, otherwise decreasing the value of the ready-to-update-reference counter, wherein the third threshold is a drift amplitude judgment threshold of the touch screen detection data frame, and the fourth threshold is a jitter judgment threshold of the touch screen detection data frame; and
   if the value of the ready-to-update-reference counter is greater than a preset fifth threshold, updating the reference update based on the current detection data frame, and resetting the ready-to-update-reference counter, wherein the fifth threshold is a preset threshold of the ready-to-update-reference counter.

7. The updating method according to claim 6, wherein the value of the fourth threshold during the condition restoration period is less than the value of the fourth threshold during a non condition restoration period.

8. The updating method according to claim 4, wherein the touch screen reference data update processing procedure with touch event includes the steps of:
   if in the condition restoration period, a displacement distance of a touch point corresponding to a touch event occurring within a preset first time window is greater than a preset sixth threshold, updating the reference data based on the current detection data frame, and resetting a ready-to-update-reference counter, wherein the sixth threshold is the touch point jump distance judgment threshold during the condition restoration period;
   if in the condition restoration period, a displacement distance of the touch point corresponding to the touch event occurring within a preset second time window keeps less than a preset seventh threshold, and if the count value of the static touch point elimination counter is less than a preset eighth threshold, updating the reference data based on the current detection data frame, resetting the ready-to-update-reference counter, and increasing/decreasing the value of the static touch point elimination counter, wherein the seventh threshold is the touch point static distance judgment threshold during the condition restoration period, and the eighth threshold is the threshold of the number of the static touch point elimination times; and
   if not in the condition restoration period, the current detection data frame contains both positive and negative dominant detection data, and the situation where there are only the positive dominant detection data has never been present since power-on, then updating the reference data based on the current detection data frame, and resetting the ready-to-update-reference counter; and
   if not in the condition restoration period, and the situation where there are only the positive dominant detection data has been present since power-on, then resetting the ready-to-update-reference counter.

9. A reference data updating system for a capacitive touch screen, comprising:
   a sampled data acquisition unit configured to perform a one-frame sampling to touch screen detection nodes;
   a reference data unit configured to store reference data of the touch screen detection nodes;
   a detection data acquisition unit configured to calculate a difference between the sampled data and corresponding current reference data of the touch screen detection nodes and store the difference as detection data to thereby obtain a current detection data frame, according to the sampled data acquired by sampling operation of the sampled data acquisition unit, the reference data unit, and the reference data stored in the reference data unit;
   a detection data classifying unit configured to classify the data of the current detection data frame acquired by the sampled data acquisition unit in terms of direction and amplitude of the data;
   a detection data frame analysis unit configured to analyze dominant detection data obtained by the classifying operation of the detection data classifying unit to determine whether the current detection data frame is a damaged detection data frame, wherein the damaged detection data frame includes negative dominant detection data, the negative dominant detection data are dominant detection data having a direction opposite to a touch signal direction, and the amplitude of the dominant detection data is greater than a touch event judgment threshold;
   a reference data updating unit configured to update the reference data stored in the reference data unit;
   a abnormal condition processing unit configured to control the reference data updating unit to execute a touch screen reference data update processing procedure under abnormal condition when an analysis result of the detection data frame analysis unit is that the current detection data frame is a damaged detection data frame;
   a normal condition processing unit configured to control the reference data updating unit to execute a touch screen reference data update processing procedure under normal condition when an analysis result of the detection data frame analysis unit is that the current detection data frame is a non-damaged detection data frame;
   a touch event determining unit configured to determine whether the current detection data frame contains a touch event under normal condition;
   a threshold providing unit configured to provide preset threshold parameters;
   a counter/timer unit configured to count number and time; and
   a condition restoration period tag unit configured to tag a condition restoration period, wherein the condition restoration period is a preset period of time after a reference data update due to detection of a damaged detection data frame.

10. The updating system according to claim 9, wherein the detection data frame analysis unit includes:
    a detection data tag module configured to tag the dominant detection data in the data obtained by the detection data classifying unit; and
    a detection data frame damaged/non-damaged determining module configured to determine whether the current detection data frame is a damaged detection data frame or not by judging the dominant detection data tagged by the detection data tag module in a manner that:
       if the dominant detection data tagged by the detection data tag module are all negative, then it is determined that the current detection data frame is a damaged detection data frame; and
       if the dominant detection data tagged by the detection data tag module contain both positive and negative dominant detection data, and none of the positive dominant detection data is continuously supported by a sufficient number of the positive dominant detection data distributed therearound, then it is determined that the current detection data frame is a damaged detection data frame, wherein the positive dominant detection data are the dominant detection data having a direction of variation with respect to the reference data that is the same as the direction of variation of the touch signal.

11. The updating system according to claim 10, wherein the detection data frame analysis unit determines whether there is one of the positive dominant detection data that is continuously supported by a sufficient number of dominant detection data distributed therearound in a manner that:
    if the number of the detection data having the same direction of this positive detection data in the detection data adjacent this positive detection data is no less than four and the number of the adjacent dominant detection data is no less than two, then it is determined that this positive dominant detection data is continuously supported by the detection data distributed therearound; otherwise, it is determined that this positive dominant detection data is not continuously supported by the detection data distributed therearound.

12. The updating system according to claim 9, wherein the abnormal condition processing unit includes:
an abnormal condition determining module configured to determine that it is currently under abnormal condition when the analysis result of the detection data frame analysis unit is that the current detection data frame is a damaged detection data frame; and
a tag, counter/timer control module configured to control the reference data update unit to execute the touch screen reference data update processing procedure under abnormal condition in a manner that:
increasing/decreasing a damaged detection data frame counter in the counter/timer unit;
quitting without any processing if a count value of the damaged detection data frame counter does not reach a preset value;
resetting a static touch point elimination counter in the counter/timer unit if the count value of the damaged detection data frame counter reaches a preset value and the counter is not in a condition restoration period, wherein the condition restoration period is a preset period of time after a reference update due to detection of a damaged detection data frame;
updating the touch screen reference data based on the current detection data, setting a condition restoration period tag, resetting and starting a condition restoration period timer in the counter/timer unit, and cancelling the condition restoration period tag when the timer is up.

13. The updating system according to claim 9, wherein the normal condition processing unit includes:
a tag, counter/timer control module configured to reset a damaged detection data frame counter in the counter/timer unit, cancel a condition restoration period tag and reset a static touch point elimination counter in the counter/timer unit when the condition restoration period timer in the counter/timer unit is up, wherein the condition restoration period is a preset period of time after a reference update due to detection of a damaged detection data frame; and
a detection data frame touch event judgment unit configured to judge whether the current detection data frame contains a touch event, and, when determining that there is a touch event, controlling the reference data update unit to execute the touch screen reference data update processing procedure with touch event, otherwise, controlling the reference data update unit to execute the touch screen reference data update processing procedure without touch event.

14. The updating system according to claim 13, wherein the detection data frame touch event judgment unit determines that the current detection data frame contains a touch event if:
if the analysis result of the detection data frame analysis unit is that the dominant detection data are all positive dominant detection data; or
if the analysis result of the detection data frame analysis unit is that the number of the positive dominant detection data is greater than the number of the negative dominant detection data; or
if the analysis result of the detection data frame analysis unit is that there is one of the positive dominant detection data that is continuously supported by a sufficient number of positive dominant detection data distributed therearound.

15. The updating system according to claim 13, wherein the normal condition processing unit further includes:
a detection data overall jitter judgment module configured to identify the detection data with jitter amplitude larger than a first threshold as large amplitude jitter detection data, wherein the first threshold is provided by the threshold providing unit as a large amplitude judgment threshold of the detection data; and
a detection data overall offset judgment module configured to judge whether a sum of absolute values of the current frame of detection data is greater than a preset third threshold, wherein the third threshold is provided by the threshold providing unit as an offset amplitude judgment threshold of the touch screen detection data;
wherein if the judgment result of the detection data overall offset judgment module is that the sum of the absolute values of the current frame of detection data is greater than the preset third threshold, or the number of the large amplitude detection data determined by the detection data overall jitter judgment module is greater than the fourth threshold, the tag, counter/timer control module increases a read-to-update-reference counter in the counter/timer unit, otherwise the read-to-update-reference counter is decreased, wherein the fourth threshold is provided by the threshold providing unit as a jitter judgment threshold of the touch screen detection data; and
wherein if the count value of the read-to-update-reference counter is greater than a fifth threshold, then the reference data update unit is controlled to update the reference data based on the current frame of detection data, and the tag, counter/timer control module resets the read-to-update-reference counter, wherein the fifth threshold is provided by the threshold providing unit as a preset threshold of the read-to-update-reference counter.

16. The updating system according to claim 13, wherein the value of the fourth threshold during the condition restoration period is smaller than its value during non condition restoration period.

17. The updating system according to claim 13, wherein the normal condition processing unit further includes a jump touch point judgment module and a static touch point judgment and elimination module;
wherein, the jump touch point judgment module is configured to judge whether the displacement distance of the touch point corresponding to a touch event is greater than a preset sixth threshold within a preset first time window during the condition restoration period, if it is greater than the sixth threshold, then the reference data update unit is controlled to update the reference data based on the current frame of detection data and the tag, counter/timer control module resets the read-to-update-reference counter, wherein the sixth threshold is provided by the threshold providing unit as a jump distance threshold of the touch point during the condition restoration period;
wherein, if the judgment result of the jump touch point judgment module within a present second time window during the condition restoration period is that the displacement distance of the touch point corresponding to the touch event keeps less than a preset seventh threshold, or the count value of the static touch point elimination counter in the counter/timer unit is less than an eighth threshold, then the reference data update unit is controlled to update the reference data based on the current frame of detection data, and the tag, counter/timer control module resets the read-to-update-reference counter in the counter/timer unit and increases/decreases the static touch point elimination counter, wherein the seventh threshold is provided by the threshold providing unit as a displacement threshold of the static touch point during the condition restoration period, and the eighth threshold is provided by the threshold providing unit as a count threshold of the static touch point elimination times;

wherein, if not in the condition restoration period, the analysis result of the detection data analysis unit is that the current detection data frame contains both positive and negative dominant detection data, and the situation where the dominant detection data are all positive has never been present since power on, then the reference data update unit is controlled to update the reference data based on the current frame of detection data, and the tag, counter/timer control module resets the read-to-update-reference counter; and wherein, if not in the condition restoration period, the situation where the dominant detection data are all positive has been present since power on, then the tag, counter/timer control module resets the read-to-update-reference counter.

18. A touch terminal comprising the reference data updating system for a capacitive touch screen according to claims 9.

* * * * *